(12) United States Patent
Harris et al.

(10) Patent No.: US 7,939,584 B2
(45) Date of Patent: *May 10, 2011

(54) BI-OR MULTI-MODAL PARTICLE SIZE DISTRIBUTION TO IMPROVE DRAG REDUCTION POLYMER DISSOLUTION

(75) Inventors: Jeffery R. Harris, Tulsa, OK (US); Lu Chien Chou, Tulsa, OK (US); George G. Ramsay, Biloxi, MS (US); John F. Motier, Broken Arrow, OK (US); Nagesh S. Kommareddi, Broken Arrow, OK (US); Thomas Mathew, Tulsa, OK (US)

(73) Assignee: Baker Hughes Incorporated, Houston, TX (US)

( * ) Notice: Subject to any disclaimer, the term of this patent is extended or adjusted under 35 U.S.C. 154(b) by 302 days.

This patent is subject to a terminal disclaimer.

(21) Appl. No.: 11/451,741

(22) Filed: Jun. 13, 2006

(65) Prior Publication Data

US 2006/0293196 A1    Dec. 28, 2006

Related U.S. Application Data

(60) Provisional application No. 60/690,347, filed on Jun. 14, 2005.

(51) Int. Cl.
*B05D 5/08* (2006.01)
*C08J 5/16* (2006.01)
*C09K 3/00* (2006.01)
*C08F 10/00* (2006.01)

(52) U.S. Cl. ........ 523/175; 523/210; 523/220; 523/221; 523/353; 524/476; 524/848; 525/185; 525/191; 525/240; 526/348

(58) Field of Classification Search ............ 523/175, 523/210, 220, 221, 353; 524/476, 848; 525/185, 525/191, 240; 526/348
See application file for complete search history.

(56) References Cited

U.S. PATENT DOCUMENTS

| | | | |
|---|---|---|---|
| 2,879,173 | A | 3/1959 | Yacoe |
| 3,351,601 | A | 11/1967 | Blaga et al. |
| 3,528,841 | A | 9/1970 | Donaldson et al. |
| 3,692,676 | A | 9/1972 | Cutter et al. |
| 3,730,275 | A | 5/1973 | McClaflin et al. |
| 3,736,288 | A | 5/1973 | Stratta et al. |
| 3,854,893 | A | 12/1974 | Rossi |
| 3,884,252 | A | 5/1975 | Kruka |
| 4,016,894 | A | 4/1977 | Baldwin et al. |

(Continued)

FOREIGN PATENT DOCUMENTS

CA    675522    12/1963

*Primary Examiner* — Vasu Jagannathan
*Assistant Examiner* — Richard A Huhn
(74) *Attorney, Agent, or Firm* — Mossman Kumar & Tyler PC

(57) ABSTRACT

Drag reduction of hydrocarbon fluids flowing through pipelines of various lengths is improved by polyolefin drag reducer dispersions or dispersions using bi- or multi-modal particle size distributions. Drag reducers having larger particle sizes dissolve more slowly than drag reducers having smaller particle sizes. By using at least bi-modal particle size distributions drag reduction can be distributed more uniformly over the length of the pipeline where smaller sized particles dissolve sooner or earlier in the pipeline and larger sized particles dissolve later or further along the pipeline.

5 Claims, 1 Drawing Sheet

U.S. PATENT DOCUMENTS

| | | | | |
|---|---|---|---|---|
| 4,212,312 | A | 7/1980 | Titus | |
| 4,340,076 | A | 7/1982 | Weitzen | |
| 4,358,572 | A | 11/1982 | Mack et al. | |
| 4,584,244 | A | 4/1986 | Fenton | |
| 4,693,321 | A * | 9/1987 | Royer | 137/13 |
| 4,720,397 | A | 1/1988 | O'Mara et al. | |
| 4,826,728 | A | 5/1989 | O'Mara et al. | |
| 4,837,249 | A | 6/1989 | O'Mara et al. | |
| 5,169,074 | A | 12/1992 | Fauth et al. | |
| 5,244,937 | A | 9/1993 | Lee et al. | |
| 5,376,697 | A * | 12/1994 | Johnston et al. | 523/175 |
| 5,449,732 | A | 9/1995 | Smith et al. | |
| 5,504,131 | A | 4/1996 | Smith et al. | |
| 5,504,132 | A | 4/1996 | Smith et al. | |
| 5,539,044 | A | 7/1996 | Dindi et al. | |
| 5,733,953 | A | 3/1998 | Fairchild et al. | |
| 6,126,872 | A | 10/2000 | Kommareddi et al. | |
| 6,160,036 | A | 12/2000 | Kommareddi et al. | |
| 6,172,151 | B1 | 1/2001 | Johnston et al. | |
| 6,399,676 | B1 | 6/2002 | Labude et al. | |
| 6,649,670 | B1 | 11/2003 | Harris et al. | |
| 6,841,593 | B2 | 1/2005 | Kommareddi et al. | |
| 6,894,088 | B2 | 5/2005 | Motier et al. | |
| 6,946,500 | B2 | 9/2005 | Harris et al. | |
| 7,119,132 | B2 | 10/2006 | Harris et al. | |
| 2003/0013783 | A1 * | 1/2003 | Kommareddi et al. | 523/175 |
| 2003/0065054 | A1 * | 4/2003 | Smith et al. | 523/175 |
| 2003/0187123 | A1 | 10/2003 | Labude et al. | |
| 2007/0021531 | A1 * | 1/2007 | Motier et al. | 523/175 |

* cited by examiner

BI- OR MULTI-MODAL PARTICLE SIZE DISTRIBUTION TO IMPROVE DRAG REDUCTION POLYMER DISSOLUTION

CROSS-REFERENCE TO RELATED APPLICATION

This application claims the benefit of U.S. Provisional Application No. 60/690,347 filed Jun. 14, 2005.

TECHNICAL FIELD

The invention relates to processes for producing and using polymeric drag reducing agents, and most particularly to processes for providing and using polymeric drag reducing agents of that are more uniformly effective over time and/or distance.

BACKGROUND

The use of polyalpha-olefins or copolymers thereof to reduce the drag of a hydrocarbon flowing through a conduit, and hence the energy requirements for such fluid hydrocarbon transportation, is well known. These drag reducing agents or DRAs have taken various forms in the past, including slurries or dispersions of ground polymers to form free-flowing and pumpable mixtures in liquid media. A problem generally experienced with simply grinding the polyalpha-olefins (PAOs) is that the particles will "cold flow" or stick together after the passage of time, thus making it impossible to place the PAO in the hydrocarbon where drag is to be reduced, in a form of suitable surface area, and thus particle size, that will dissolve or otherwise mix with the hydrocarbon in an efficient manner. Further, the grinding process or mechanical work employed in size reduction tends to degrade the polymer, thereby reducing the drag reduction efficiency of the polymer.

One common solution to preventing cold flow is to coat the ground polymer particles with an anti-agglomerating or partitioning agent. Cryogenic grinding of the polymers to produce the particles prior to or simultaneously with coating with an anti-agglomerating agent has also been used. However, some powdered or particulate DRA slurries require special equipment for preparation, storage and injection into a conduit to ensure that the DRA is completely dissolved in the hydrocarbon stream. The formulation science that provides a dispersion of suitable stability such that it will remain in a pumpable form necessitates this special equipment.

Gel or solution DRAs (those polymers essentially being in a viscous solution with hydrocarbon solvent) have also been tried in the past. However, these drag reducing gels also demand specialized injection equipment, as well as pressurized delivery systems. The gels or the solution DRAs are stable and have a defined set of conditions that have to be met by mechanical equipment to pump them, including, but not necessarily limited to viscosity, vapor pressure, undesirable degradation due to shear, etc. The gel or solution DRAs are also limited to about 10% polymer as a maximum concentration in a carrier fluid due to the high solution viscosity of these DRAs. Thus, transportation costs of some conventional DRAs are considerable, since up to about 90% of the volume being transported and handled is inert material.

From reviewing the many prior processes it can be appreciated that considerable resources have been spent on both chemical and physical techniques for easily and effectively delivering drag reducing agents to the fluid that will have its drag or friction reduced. Yet none of these prior methods has proven entirely satisfactory. Thus, it would be desirable if a drag reducing agent could be developed which rapidly dissolves in the flowing hydrocarbon, which could minimize or eliminate the need for special equipment for preparation and incorporation into the hydrocarbon fluid.

Another important consideration in the production and of polymeric drag reducing agents is the achieving of drag reduction substantially throughout the entire length of a hydrocarbon pipeline. A typical concern for a lengthy pipeline is that the drag reducing agent dissolves relatively soon or early, and are spent before the hydrocarbon is completely pumped and arrives at its destination.

It would thus be additionally advantageous if a process or product existed for providing drag reduction more uniformly over the substantial length of a hydrocarbon pipeline and/or for substantially all of the hydrocarbon being transported.

SUMMARY

There is provided, in one non-limiting embodiment, a method for introducing polymer DRAs into a hydrocarbon fluid that involves introducing a first DRA having a first particle size distribution into the hydrocarbon fluid, and introducing a second DRA having a second particle size distribution into the hydrocarbon fluid. The second particle size distribution is different from the first particle size distribution. The introductions can be conducted separately or together. The first DRA and the second DRA may be made by different processes.

In an alternate non-limiting embodiment of the invention, there is provided a multi-modal polymer drag reducing composition that involves a first DRA having a first particle size distribution, and a second DRA having a second particle size distribution. The second particle size distribution is different from the first particle size distribution, and at least one of the drag reducing agents is a polyalpha-olefin. Again, the first DRA and the second DRA may be made by different processes.

In another non-limiting embodiment of the invention, there is offered a fluid having reduced drag that includes a hydrocarbon fluid, a first DRA having a first particle size distribution, and a second DRA having a second particle size distribution. The second particle size distribution is different from the first particle size distribution.

DETAILED DESCRIPTION

Figure 1:
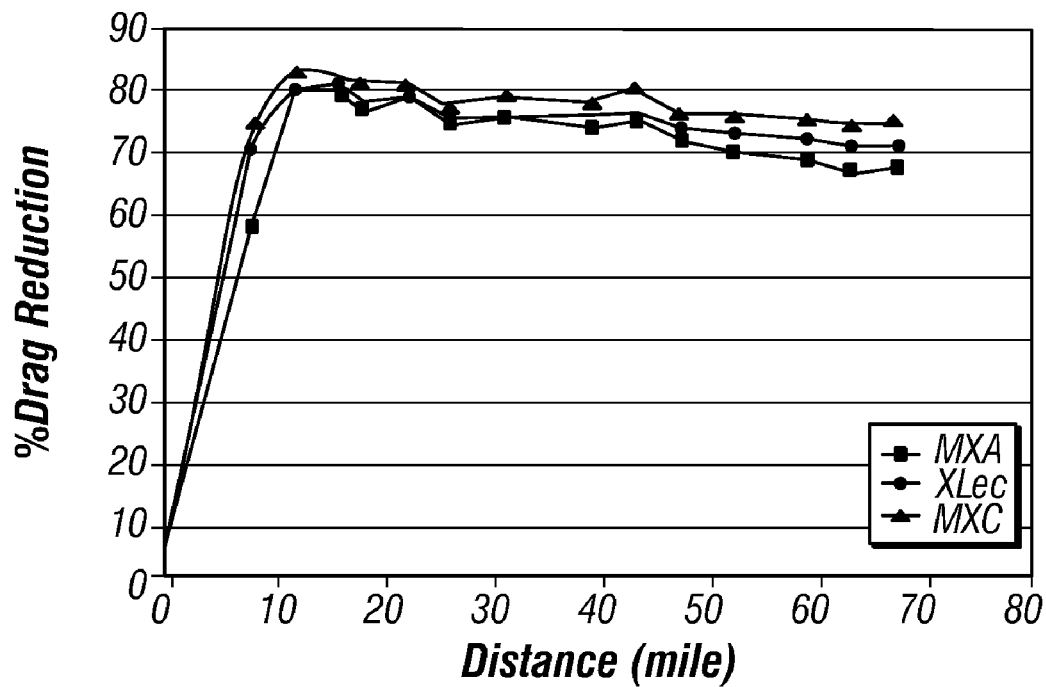
FIG. 1 is a performance profile plot of % drag reduction as a function of distance for a DRA of the invention contrasted with two comparative DRAs.

The invention involves the utilization of bi-modal or multi-modal particle size distributions in polyolefin drag reducing compositions such as dispersions or slurries to enhance or modify dissolution rates of polyolefin drag reducing agents such that dissolution proportional to drag reducing performance may be designed, tailored or customized to a particular hydrocarbon pipeline as a function of distance. It is well known that the performance of a drag reducing slurry or dispersion or other composition, given that the polymer is of sufficient molecular weight, is a function of particle size and thus surface area which affects the effective dissolution rate in a given distance of pipeline. Hence, a particle size distribution having a mean particle size, as determined by laser diffraction techniques via a commercial Microtrac S3000 particle size analyzer available from Microtrac, Inc. (as a non-limiting example of one kind of analytical instrument), of 100 microns dissolves quickly in a pipeline producing an effective reduction in drag.

However, a sacrifice in having the polymer dissolve quickly is that the polymer is thereafter subject to shear degradation and drag reducing performance begins to decrease with increased distance into the pipeline. Larger particle size distributions (e.g. 200 to 500 microns) dissolve slower due to the decreased surface area, thus the drag reducing effects are less evident in the early part of the pipeline, but become more noticeable with increased distance. The onset or effect of shear degradation is less noticeable given that dissolution is slower with larger particles and less polymer is in solution to display shear degradation. Therefore, drag reduction appears to be more effective with larger (broader) particle size distributions over pipeline distances vs. relatively shorter pipelines.

The resolution to the conflict of dissolution rate vs. pipeline distance is the utilization of drag reducing slurries having bi-modal or multi-modal particle distributions such that the distribution profile (i.e. drag reduction profile) of polymer in a pipeline can be tailored or customized to fit the distance of the pipeline. Flow in relatively short pipelines (in a non-limiting example, 20 miles or less) works very well with the smaller (narrower) particle size distributions via early or effective drag reduction from the small particles and long term drag reduction benefits more from relatively larger or broader particle size distributions. In summary, a bi-modal or multi-modal distribution of particle sizes, which effectively varies the dissolution rate, would allow one to utilize both relatively small and large DRA particles to give or provide a "dissolution distribution" that would be effective over substantially the entire length of a long pipeline (in one non-limiting embodiment, greater than 20 miles). Fast dissolving particles would provide excellent drag reduction in the early part of the line and large particles (slower dissolving) would extend drag reduction in the larger segments.

It should also be understood that although reference is made to polyalpha olefins as a suitable drag reducer for hydrocarbon fluids that the invention is not limited to these particular polymers, but that other polymers known to reduce drag or friction in hydrocarbons may be used in the compositions and methods of this invention. On the other hand, one, both or all of the DRAs may be polyalpha olefins in one non-restrictive embodiment of the invention. It must also be understood that "drag reduction" includes, but is not necessarily limited to, any reduction, decrease, retardation, controlling, inhibiting, suppression, or other lowering of the effects of friction or drag of hydrocarbon flowing through a pipeline and/or power requirements for transporting a hydrocarbon through a pipeline. It is not necessary for drag or friction to be completely eliminated using the compositions and methods of this invention, nor for drag or friction to be reduced or lowered by any particular amount for the compositions and methods herein to be considered successful.

Hydrocarbon systems to which the DRA compositions of this invention may be applied include, but are not necessarily limited to, any flowing stream that has a large hydrocarbon component. By "large hydrocarbon component" is meant at least 60-99% volume percent hydrocarbon or oleaginous material. Hydrocarbon systems include, but are not necessarily limited to, multiphase flowlines (for example oil/water, water/oil, oil/water/gas) in oil and gas production systems, including gas transmission lines (e.g. gas/condensate, gas/condensate/water). It is expected that the invention could apply to any hydrocarbon fluid flowing in a pipeline or well, whether or not water or gas is present. It will be appreciated that by the term "hydrocarbon fluid", it is expected that oxygenated hydrocarbons such as methanol, ethanol, ethers, and the like are included within the definition. Thus, multiphase hydrocarbon-containing systems (e.g. oil/water, water/oil, oil/gas, oil/water/gas), such as oil production flow lines and gas export lines are primary applications for this technology.

Preparation of Slurries Containing Multi-modal Particle Distributions

There are a number of different processes that can be utilized to prepare drag reducing polyolefin slurries. The multi-modal particle size distribution compositions of this invention are not necessarily limited to those discussed herein, but may include others. It will be understood within the context of this invention that "multimodal" includes "bi-modal". Some of the major processes for producing DRAs that will be discussed and the average particle size distributions are given in Table I.

TABLE I

Average Particle Size Distribution of Some DRAs Produced by Various Methods (in Microns)

| A - Precipitation/Slurry | B - Bulk/Ambient Ground | C - Bulk/-Homogenized | D - Bulk/Cryogenic Ground | E - Encapsulated |
|---|---|---|---|---|
| 100-150 | 350-550 | 250-350 | 100-200 | Microcapsules 150-5000 Macrocapsules >5000-15,000 |

Alternatively, the first and second (third, and subsequent, as applicable) particle size distributions (PSDs) may have a lower threshold selected from the group consisting of about 100, about 150, about 200, about 250, about 300, about 450 and about 5000 microns. In another non-limiting embodiment, the upper threshold of these PSDs may be independently selected from the group consisting of about 150, about 200, about 250, about 300, about 350, about 400, about 450, about 500, about 550, about 5000 and about 15,000 microns.

One non-limiting embodiment of method A involves precipitation of solution-based polymer by non-solvent techniques into slurry formulations. In another non-limiting embodiment of the precipitation process, a high molecular weight polyalpha-olefin (PAO) is polymerized from the monomer or monomers in a solvent for α-olefin monomers. A suitable non-solvent for the polymers is slowly added to the neat drag reducer, which is simply the PAO in the solvent in which the polymerization occurs. The non-solvent should be added at a rate that will allow the drag reducer mixture to absorb the non-solvent, as well as precipitate the polymer. This rate depends on the amount of agitation in the mixing system used. If the rate of non-solvent addition is too high, it will make a precipitate that is not uniform in size with particles possibly too large in size for use as a DRA in slurry form, and will contain undesirably high amounts of solvent. During the addition, the neat drag reducer will go through a viscosity reduction until the PAO precipitates. At this point, the mixture becomes a slurry concentrate of precipitated polymer particles. The weight ratio of liquid, non-solvent to solvent at this point may range from about 70/30 to 30/70, where, in one non-limiting, preferred embodiment, the ratio is about 50/50. Slurry concentrates having low viscosity and a high concentration of DRAs are further described as being made through a carefully controlled precipitation process in U.S. Pat. No. 5,733,953 assigned to Baker Hughes Incorporated, incorporated by reference herein in its entirety.

Method B may include, but is not necessarily limited to, bulk polymerization of any of the known polymers useful in reducing the drag or friction of hydrocarbon fluids, such as PAOs, and then grinding the bulk polymer at ambient temperatures to give particles of sufficient size, e.g. about 350 to about 550μ. Alternatively, Method B may involve grinding the bulk polymer at non-cryogenic temperatures, where cryogenic temperatures are defined elsewhere herein.

For the purposes of this invention, ambient temperature conditions are defined as between about 20-25° C. (about 68-77° F.). In one non-limiting embodiment of the invention, ambient temperature is defined as the temperature at which grinding occurs without any added cooling. Because heat is generated in the grinding process, "ambient temperature" may in some contexts mean a temperature greater than about 20-25° C. (about 68-77° F.)—a typical range for the term "ambient temperature". In still another non-limiting embodiment of the invention, the grinding to produce particulate polymer drag reducing agent is conducted at a chilled temperature that is less than ambient temperature, but that is greater than cryogenic temperature for the specific polymer being ground. In one non-limiting embodiment, the chilled temperature may range from about −7 to about 2° C. (about 20 to about 35° F.).

The polymerization apparatus may be composed of at least one or a series of continuous stirred tank reactors (CSTRs) where raw materials (e.g. monomers and catalysts) are continuously charged, allowed an appropriate dwell or residence time in the reactor system, such that an adequate molecular weight or viscosity is obtained.

In one non-limiting embodiment of the invention, the nature of the ambient grinding process is such that a grinding aid renders a granulated polyolefin polymer into a ground state of fine particles of 600 microns or less at ambient conditions, in one non-limiting embodiment of the invention. This size reduction process may involve the use of an attrition mill, such as a Pallmann Pulverizer, in combination with a grinding aid or agent of suitable hardness in that shearing and surface blocking properties are imparted into the grinding chamber such that particle agglomeration and gel ball formation of soft polyolefins are prevented.

In one non-limiting embodiment, the grinding aid may be a microcrystalline component, such as a microcrystalline polymer or copolymer. These solid grinding aids may be products such as MICROTHENE® ethylene-co-butylene crystalline powders available from Equistar. It has been discovered that other, more traditional grinding aids such as calcium stearate or ethylene-bis-stearamide are too soft and inadequate in preventing agglomeration of polymer in the grinding chamber. It is important that the solid grinding aid impart the required shearing action in the grinding or pulverizing chamber in order to achieve the small polymer particles of 600 microns or less.

Another important portion of the invention is the formulation of the finely ground, polymer drag reducing agents into suitable dispersing fluids such that the agent may be delivered in accurate concentrations into a pipeline, and at the same time, avoid the traditional unstable dispersive mixtures of the past. The literature has many examples of slurries of drag reducing agents being composed of a variety of mixtures, more commonly those of water and glycol mixtures, to help prevent cold flow problems.

The present invention can avoid cold flow problems by providing for a unique slurry or non-solvent mixture based on a combination of several hydrocarbon fluids in combination with one of those components having a melting point above two other fluids in the mixture. It has been found that the DRAs of one non-limiting embodiment, once ground to 600 microns or smaller, may be dispersed in a hydrocarbon mixture composed, in one non-limiting embodiment of 25% polymer, 22.5% butyl cellosolve, 22.5% hexanol, and 40% mineral oil such as a Penreco petrolatum (Penreco Ultima, melting point 130-135° F. or 54-57° C.). These components are added together above the melting point of the petrolatum (in one non-limiting embodiment, 140° F. or 60° C.), and upon cooling, the stable mixture formed exists as a thick slurry that may be pumped quite freely with traditional methods and equipment. The petrolatum, once congealed, acts as a flow or stabilizing aid for the particulate system. Further details about a continuous process to produce DRAs by ambient grinding may be found in U.S. Pat. No. 6,649,670 assigned to Baker Hughes Incorporated, hereby incorporated by reference in its entirety.

A homogenization method C for producing a polymer drag reducing agent (DRA) slurry may involve feeding to a homogenizer components including, but not necessarily limited to, a granulated polymer DRA and a liquid non-solvent for the polymer DRA. In one non-limiting embodiment, the polymer is a PAO. These components are homogenized to reduce the particle size of the polymer DRA to yield a polymer DRA slurry. Examples of suitable non-solvents include water and nonaqueous non-solvents including, but not necessarily limited to, alcohols, glycols, glycol ethers, ketones, and esters; having from 2-6 carbon atoms, and combinations thereof. The polymeric DRA may be homogenized to particle sizes of 600 microns or less, preferably in the range of 250-350 microns.

Examples of homogenizers useful in method C include, but are not necessarily limited to Ross Mega-Shear homogenizers available from Ross Mixers, Inc. and Megatron in-line homogenizers offered by Kinematic, Inc. Further details about method C and the slurries and particulates formed thereby may be found in U.S. Pat. No. 6,894,088, hereby incorporated by reference in its entirety.

Methods D for cryogenically grinding bulk polymerized DRAs are well known in the art, and some were briefly outlined in the Background of the Invention, supra. In general, the polymer is bulk polymerized according to known techniques, and then ground at a cryogenic temperature, generally defined as below the glass transition temperature, Tg, of the polymer, to avoid the particles cold flowing together. Anti-agglomeration agents are often applied to prevent the particles from cold flowing or sticking once their temperature is raised above Tg. Within the context of the invention, such agglomeration agents include, but are not necessarily limited to talc, alumina, calcium stearate, ethylene bis-stearamide and mixtures thereof. A particular process will be described below in the preparation of slurries involving cryogenic materials.

Encapsulation processes E are also known in the art. Of particular interest are those where the core includes compounds that are polymers formed within a shell and monomers that are polymerized within the shell, where the shell is inert to the core. Such polymers are thus produced by a small scale bulk polymerization process at very high molecular weights using little or no solvent. Further details on microencapsulating DRAs may be found in U.S. Pat. Nos. 6,126,872 and 6,160,036, and further details on macrocapsules containing DRAs may be found in U.S. Pat. No. 6,841,593, all assigned to Baker Hughes Incorporated, and all incorporated in their entirety by reference herein. Within the context of the compositions and methods herein, microcapsules are defined as having a size of 5000 microns or less, between about 150 to about 5000 microns in another non-restrictive embodiment. In still another non-limiting version herein, the outside diameter of the microencapsulated DRA (outside diameter of shell 24) is about 1000 microns or less, and in another embodiment about 500 microns or less. Macrocapsules in one non-limiting embodiment of the invention may range from greater than about 5000 to about 15,000 microns.

Given the breadth of the particle size distributions seen in Table I above, it is easy to see that a number of particle or process combinations may be linked together with the end goal being to tailor the dissolution characteristics of the polymer in the pipeline via particle size distribution design and manipulation. In some non-limiting examples, blends of A and B, or A and C may be utilized to provide the smaller and larger particle size to give a particular particle size combination. These blends or mixtures could be prepared by combining a slurry of each component to achieve a final slurry or polymer concentration of between about 20 to about 25 wt %. In these bi-modal slurries, the slurries may be composed of from between about 5 and about 20 wt % each in one non-limiting embodiment, and from between about 10 and about 10 wt % each in an alternate, non-limiting embodiment, or alternatively in approximately equal proportions. Again, it should be understood that the proper or optimized proportions would depend on the length of the pipeline treated. One would design or tailor mix the combinations given a particular distance and dissolution profile needed for adequate drag performance of the pipeline. The balance of the composition would be slurry carrier material, in one non-restrictive embodiment, non-solvents for the DRA.

It will also be appreciated that in many cases, it is not possible to predict in advance the proportion of first DRA and second DRA (and possibly third or more DRAs) each having their own particle size distribution, since the design of the composition will depend upon a number of complex, interrelated factors including, but not necessarily limited to, the nature of the hydrocarbon stream, the temperature of the hydrocarbon fluid, the length of the pipeline, the particular particle size distributions of the DRAs selected, the processes by which the particular DRAs were made, and the like.

As with particles from process A, the cryogenically ground polymer D may also be utilized as the smaller-sized particle distribution component, with individual mixtures of B and C via a particular grinding and blending technique. Thus, upon cryogenic grinding of bulk polymer, the frozen polymer would fall directly and/or immediately into the slurry of either B or C, the liquid component of either B or C acting as a wetting and dispersing agent for the newly ground polymer. Again, the beginning slurry of B or C would be in the range of about 5 to about 20 wt % with the addition of cryogenically ground polymer in the amount of final polymer concentration to equal a total of about 20 to about 25 wt %.

Alternatively, the cryogenically ground polymer D, homogenized polymer C or ambient ground polymer B could be immediately placed into the slurry of type A. In the context of this invention, the term "immediately" means to make the indicated placement, introduction or mixing before substantial cold flow can occur. Indeed, a goal is to prevent, inhibit or reduce the possibility of cold flow.

It should be noted that polymeric DRAs suitable for reducing drag or friction in hydrocarbon fluids are not suitable for use in reducing drag or friction in aqueous fluids and vice versa. One DRA commonly used to reduce drag in aqueous fluids are polyethylene oxides (PEO). Additionally, PAOs generally have molecular weights considerably greater than PEOs, on the order of about 25 to 35 million weight average molecular weight, whereas PEOs have number average molecular weights typically from about 1 to about 5 million weight average molecular weight.

Some of the features of the invention already discussed will now be elaborated on in more detail, and other alternative embodiments will be mentioned.

DRA Polymers for Hydrocarbons

Suitable DRA polymers for the invention will now be further discussed in more particular detail. Generally, the polymer that is processed in a method herein may be any conventional or well known polymeric drag reducing agent (DRA) including, but not necessarily limited to, poly(alpha-olefin), polychloroprene, vinyl acetate polymers and copolymers, and mixtures thereof and the like. In one embodiment of the invention, the monomer is any monomer which, when polymerized, forms a polymer suitable for use as a drag reducing agent (DRA). Such monomers are well known in the art and include, but are not necessarily limited to, alpha-olefins, such as 1-hexene, 1-octene, 1-decene, 1-dodecene, 1-tetradecene, and the like; isobutylene; alkyl acrylates; alkylmethacrylates; alkyl styrene; and the like. Copolymers of these monomers may also make suitable drag reducing agents.

Polyalpha-olefins, which in one non-limiting embodiment are preferred herein, are polymerized from the monomers or comonomers by conventional techniques and will have molecular weights above 10 million. Polyalpha-olefins particularly suitable for the processes and compositions of this invention include the FLO® family of PAO DRAs, including FLO® 1004, FLO® 1005, FLO® 1008, FLO® 1010, FLO® 1012, FLO® 1020 and FLO® 1022 DRAs sold by Baker Pipeline Products, a division of Baker Petrolite Corporation. These DRAs are used for hydrocarbon streams.

The polymerization of certain monomers may be conducted by the inclusion of a catalyst into the monomer during or prior to inclusion of the monomer in at least one CSTR, in a non-limiting example. Any known suitable catalyst and/or cocatalyst may be used for the methods herein as long as they sufficiently catalyze the reaction to a sufficient extent to meet the objectives of the inventive methods. Metallocenes are useful catalysts for polymerizing some monomers. In the case of alpha-olefins, polymerization may be conducted by the inclusion of a mixture of Ziegler-Natta catalyst and co-catalyst(s) into the monomer. Catalysts for the polymerization of alpha-olefins include, but are not necessarily limited to, powdered catalyst $TiCl_3AA$ (aluminum activated titanium trichloride); co-catalyst(s), diethylaluminum chloride (DEAC), and diethylaluminum ethoxide (DEALE); TEAL (triethyl aluminum chloride), tri-methyl aluminum, tri-isobutyl aluminum, MAO (methylaluminoxane) and the like. Of course, it will be necessary to match the co-catalyst with the main catalyst, so that the catalytic activity of the main catalyst is triggered only by the presence of a particular co-catalyst or class thereof. All components (monomer, catalyst, and co-catalyst(s)) required for the monomer to convert to high polymer can be brought together in various different ways that are not necessarily critical to the methods and compositions herein. In one non-limiting embodiment of the invention, it may be necessary or desirable to use a series of CSTRs.

Care must be taken to avoid poisons for particular catalysts or polymerizations. For example, if Ziegler-Natta catalysts are used to polymerize α-olefins, the presence of oxygen must be avoided since it deactivates both anionic and cationic catalyst systems. Water, in any quantities other than minute molecular quantities, may also be a poison.

Certain monomers may be polymerized by the use of UV radiation to initiate reaction in place of or in addition to the use of catalysts and/or co-catalysts.

Polymer Size Reduction

In one non-limiting embodiment herein as mentioned, the grinding for producing particulate polymer drag reducing agent is conducted at non-cryogenic temperatures. For the purposes of this invention, cryogenic temperature is defined as the glass transition temperature ($T_g$) of the particular polymer having its size reduced or being ground, or below that temperature. It will be appreciated that $T_g$ will vary with the specific polymer being ground. Typically, $T_g$ ranges between about −10° C. and about −100° C. (about 14° F. and about −148° F.), in one non-limiting embodiment. As noted, in another non-restrictive version herein, the grinding for producing particulate polymer drag reducing agent is conducted at ambient temperature as previous defined. Poly(alpha-olefin) is a preferred polymer in one nonlimiting embodiment of the invention. In one non-restrictive embodiment of the invention, the polymer may have its size reduced in one step, or may have its size reduced in multiple steps or stages. For instance, the polymer may be granulated, that is, broken up or otherwise fragmented into granules in the range of about 6 mm to about 20 mm, preferably from about 8 mm to about 12 mm. It is permissible for the granulated polymer to have an anti-agglomeration agent thereon.

Within the context of the methods and compositions herein, the term "granulate" refers to any size reduction process that produces a product that is relatively larger than that produced by grinding or homogenizing. Further within the context herein, "grinding" refers to a size reduction process that gives a product relatively smaller than that produced by "granulation". "Grinding" may refer to any milling, pulverization, attrition, or other size reduction that results in particulate polymer drag reducing agents of the size and type that are the goal of the invention.

While grinding mills, particularly attrition mills such as Pallmann attrition mills, Munson centrifugal impact mills, Palmer mechanical reclamation mills, etc. may be used in various non-limiting embodiments of the invention, other grinding machines may be used in the methods herein as long as the stated goals are achieved.

The solid organic grinding aid may be any finely divided particulate or powder that inhibits, discourages or prevents particle agglomeration and/or gel ball formation during grinding. The solid organic grinding aid may also function to provide the shearing action necessary in the pulverizing or grinding step to achieve polymer particles of the desired size. The solid organic grinding aid itself has a particle size, which in one non-limiting embodiment of the invention ranges from about 1 to about 50 microns, preferably from about 10 to about 50 microns. Suitable solid organic grinding aids include, but are not necessarily limited to, ethene/butene copolymer (such as MICROTHENE®, available from Equistar, Houston), paraffin waxes (such as those produced by Baker Petrolite), solid, high molecular weight alcohols (such as Unilin alcohols ($C_{12}$-$C_{60}$) available from Baker Petrolite), and any non-metallic, solid compounds composed of C and H, and optionally N and/or S which can be prepared in particle sizes of 10-50 microns suitable for this process, and mixtures thereof. Some traditional grinding aids such as talc, calcium stearate, ethylene-bis-stearamide were discovered to be ineffective as solid, organic grinding aids. In one particular, non-limiting embodiment, the solid organic grinding aid of this invention has an absence of fatty acid waxes.

Slurries of DRAs

In one non-restrictive embodiment herein where the polymers are not reduced in size at cryogenic temperatures, the finely ground, drag reducing agents are dispersed in a suitable fluid. Besides those previously mentioned, a dispersing fluid in one non-limiting embodiment may be a mixture of at least two hydrocarbon fluids, where a first fluid has a melting point above the melting point of a second fluid. In another non-restrictive version herein, the dispersing fluid includes at least three hydrocarbon fluids, where one of the fluids has a melting point above the melting points of the other two fluids.

In the case where two components are used in the dispersing fluid, the first fluid may range from about 30 wt % to about 35 wt % of the total dispersing fluid, and the second fluid may range from about 40 wt % to about 45 wt % of the total dispersing fluid. In the case where the dispersing fluid is composed of at least three components, the first fluid may range from about 30 wt % to about 35 wt % of the total dispersing fluid, and the combined proportion of the other two component fluids (or multiple components) may range from about 40 wt % to about 45 wt % of the total dispersing fluid.

In one non-limiting embodiment herein, from about 25 to about 30 weight % of the total slurry is the polymer DRA of the methods and compositions herein, preferably from about 28 to about 32 weight % of the total slurry.

It is important when dispersing the polymer into a fluid mixture containing an ambient solid petroleum compound, that the fluid mixture be heated above the melting point of the petroleum oil. Once mixed and allowed to cool, moderate agitation may be utilized to render a flowable mixture. (There is no particular or critical method or technique for incorporating the ground DRA polymer into the dispersing fluid, as long as the slurry is mixed or combined to be uniform.) A surprising feature of the dispersing fluid aspect of the methods and compositions herein is that no additional emulsifiers, dispersants, surfactants and/or thickening agents are required to keep the particulate polymer DRA stable in the slurry, as is often the case with some prior DRA slurries.

It is expected that the resulting particulate polymer DRAs can be easily transported without the need for including appreciable amounts of an inert solvent, and that the particulate polymer DRAs can be readily inserted into and incorporated within a flowing hydrocarbon, and possibly some oil-in-water emulsions or water-in-oil emulsions, as appropriate. DRA products made by the process of this invention flow readily under moderate pressure or pumping and contain a relatively high percentage, from about 70-80% of active polymer. Furthermore, in most cases there is an absence of any need to add an additional anti-agglomeration aid or partitioning agent to the DRA after it is ground to its desirable size. After the polymer is ground, a concentrated mixture of 70-80% polymer mixed with grinding aid results. Once the polymer is placed in the dispersing fluids, the amount of polymer averages about 25-30% in the dispersive mixture.

Example 1

A field test was conducted of three different drag reducing formulations having differing particle dimensions. One product was a commercial sample (FLO® XLec drag reducing additive available from Baker Petrolite) as produced by aforementioned methods of precipitation technology. The particle size or distribution of the product was 100-150 microns. A second commercial product tested was FLO® MXC drag reducing additive (available from Baker Petrolite) as produced by bulk polymerization followed by grinding technology on the Ross Mega-Shear homogenizer. The particle size of the FLO® MXC product was 250-300 microns. A third formulation tested was a mixture of the FLO® XLec and FLO® MXC products, combined in a 2 to 3 weight ratio of polymer (40% FLO® XLec by weight of polymer to 60% FLO® MXC by weight of polymer) hereafter referred to as FLO® MXA drag reducing additive. The drag performance of the three products was tested in 60 mile long (97 km), 20" (51 cm) diameter pipeline carrying crude with specific gravity of 0.84 and a viscosity of 8.4 centistokes ($8.4 \times 10^{-6}$ m$^2$/s). The temperature of the crude oil was 70° F. (21° C.). The oil flow was 14,000 barrels per hour (about 2,200 m$^3$/hour), equivalent to a Reynolds Number of 200,000 and the time for line fill of the pipeline was 9 hours. The dosage rate of drag reducing compositions injected into the pipeline was comparable in nature. Pressure transducers along the length of the pipeline allowed frequent measurements which were equated to drag reduction and also profiled the dissolution, hence performance of the three products. The performance profile of the three products is shown in FIG. 1.

In FIG. 1 it may be seen that the product with the largest particle size profile (FLO® MXC) dissolved slower and did not perform as well as its counterparts. FLO® XLec containing the smallest particle size dissolved faster and displayed better performance with distance. On the other hand, FLO®MXA containing a mixture or bi-modal distribution of particles from FLO® XLec and FLO® MXC performed well at the outset and consistently performed better with distance than either the FLO® XLec or FLO® MXC by themselves.

Example 2

Figure 2:
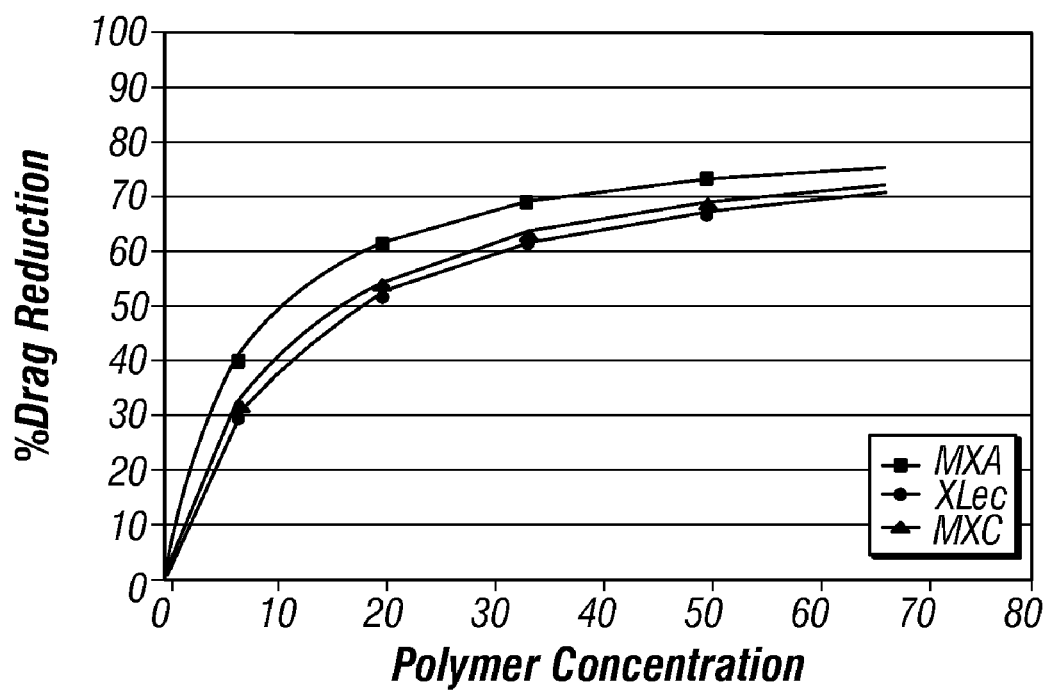
FIG. 2 is a performance curve plot of % drag reduction as a function of polymer concentration for a DRA of the invention contrasted with two comparative DRAs.

A second field test was conducted utilizing the three aforementioned formulations in a 300 mile long (482 km), 40" (102 cm) diameter pipeline carrying crude with specific gravity of 0.8 and a viscosity of 2.0 centistokes ($2.0 \times 10^{-6}$ m$^2$/s). The temperature of the crude oil was 75° F. (24° C.). The oil flow was 22,000 barrels per hour (about 3,500 m$^3$/hour), equivalent to a Reynolds Number of 570,000 and the time for line fill of the pipeline was 5 days. The dosage rate of drag reducing compositions injected into the pipeline was again comparable in nature. Given that there was a lack of frequent pressure transducers along the pipeline, the information gathered allowed generation of information relating to the overall performance with respect to drag reducer content rather than performance per distance as in FIG. 1. The actual performance in drag reduction was 43% for FLO® MXC, 46% for FLO® XLec, and 54% for FLO® MXA. A performance plot of the FLO® XLec, FLO® MC, and FLO® MXA products is shown in FIG. 2.

Thus, it can be seen both FLO® XLec and FLO® MX functioning by themselves performed at lower levels of drag reduction in this particular pipeline. However, when the individual polymer components were combined to give a bi-modal range of particle distribution, they reinforced each other to produce a formulation (FLO® MXA) with better overall drag reduction performance.

A polymer DRA composition that dissolves over a greater time period and/or distance through a pipeline has been discussed and provided herein. Further, a polymer DRA of suitable particle size and adequate surface area for paced or distributed dissolution and dissipation in a flowing hydrocarbon stream has been described. There has also been established a method to continuously produce a polymer DRA that can be readily transported and introduced into a hydrocarbon fluid.

Many modifications may be made in the composition and process of this invention without departing from the spirit and scope thereof that are defined only in the appended claims.

For example, the exact nature of and proportions of monomer and catalyst, proportion of the particular drag reducing agents, the grinding process, the exact composition of the composition, DRA production methods, particle size distribution, etc. may be different from those discussed and used here. Particular processing techniques may be developed to enable the components to be homogeneously blended and work together well, yet still be within the scope of the invention. Additionally, proportions and types of the various components are expected to be optimized for each application or pipeline.

What is claimed is:

1. A method for introducing polymer drag reducing agents into a hydrocarbon fluid, comprising:
   precipitating a first drag reducing agent (DRA) into a slurry comprising a non-solvent for the first DRA and removing solvent for the polymer that is present, the non-solvent comprising a non-solvent selected from the group consisting of an alcohol, a glycol, a glycol ether, a ketone, and an ester, where the first DRA has a particle size distribution ranging from about 100 to about 150 microns;
   preparing a second DRA by a method selected from the group consisting of: non-cryogenic grinding of a bulk polymerized polymer, cryogenic grinding of a bulk polymerized polymer, homogenizing a bulk polymerized polymer, and combinations thereof, wherein the bulk polymerized polymers are not microcapsules or macrocapsules of polymers formed within a shell, wherein microcapsules are defined as having a size of 5000 microns or less and wherein macrocapsules are defined as having a size of greater than about 5000 to about 15,000 microns,
   wherein the second DRA has a particle size distribution different from the first particle size distribution, and the second DRA has a particle size distribution ranging from about 100 to about 550 microns; and
   introducing the first DRA into the hydrocarbon fluid; and
   introducing the second DRA into the hydrocarbon fluid, wherein the first DRA and the second DRA are polyalpha-olefins.

2. A method for introducing polymer drag reducing agents into a hydrocarbon fluid, comprising:
   precipitating a first drag reducing agent (DRA) into a slurry comprising a non-solvent for the first DRA and removing solvent for the polymer that is present, the non-solvent comprising a non-solvent selected from the group consisting of an alcohol, a glycol, a glycol ether, a ketone, and an ester, where the first DRA has a particle size distribution ranging from about 100 to about 150 microns;
   preparing a second DRA by a method selected from the group consisting of: non-cryogenic grinding of a bulk polymerized polymer, cryogenic grinding of a bulk polymerized polymer, homogenizing a bulk polymerized polymer, and combinations thereof, wherein the bulk polymerized polymers are not microcapsules or macrocapsules of polymers formed within a shell, wherein microcapsules are defined as having a size of 5000 microns or less and wherein macrocapsules are defined as having a size of greater than about 5000 to about 15,000 microns,
   wherein the second DRA has a particle size distribution different from the first particle size distribution, and the second DRA has a particle size distribution ranging from about 100 to about 550 microns; and introducing the first DRA and the second DRA into the hydrocarbon fluid essentially simultaneously;

where the first DRA and the second DRA are polyalpha-olefins.

3. A multi-modal polymer drag reducing composition produced by the process comprising combining:

a first drag reducing agent (DRA) prepared by precipitating the DRA into a slurry comprising a non-solvent for the first DRA and removing solvent for the polymer that is present, the non-solvent comprising a non-solvent selected from the group consisting of an alcohol, a glycol, a glycol ether, a ketone, and an ester, where the first DRA has a particle size distribution ranging from about 100 to about 150 microns; and a second DRA prepared by a method selected from the group consisting of: non-cryogenic grinding of a bulk polymerized polymer, cryogenic grinding of a bulk polymerized polymer, homogenizing a bulk polymerized polymer, and combinations thereof, wherein the bulk polymerized polymers are not microcapsules or macrocapsules of polymers formed within a shell, wherein microcapsules are defined as having a size of 5000 microns or less and wherein macrocapsules are defined as having a size of greater than about 5000 to about 15,000 microns, wherein the second DRA has a particle size distribution different from the first particle size distribution, and the second DRA has a particle size distribution ranging from about 100 to about 550 microns; and where both DRAs are polyalpha-olefins.

4. The multi-modal polymer drag reducing composition of claim 3 where the composition consists essentially of the first DRA and the second DRA.

5. A fluid having reduced drag comprising:

a hydrocarbon fluid;

a first drag reducing agent (DRA) prepared by precipitating the DRA into a slurry comprising a non-solvent for the first DRA and removing solvent for the polymer that is present, the non-solvent comprising a non-solvent selected from the group consisting of an alcohol, a glycol, a glycol ether, a ketone, and an ester, where the first DRA has a particle size distribution ranging from about 100 to about 150 microns; and a second DRA prepared by a method selected from the group consisting of: non-cryogenic grinding of a bulk polymerized polymer, cryogenic grinding of a bulk polymerized polymer, homogenizing a bulk polymerized polymer, and combinations thereof, wherein the bulk polymerized polymers are not microcapsules or macrocapsules of polymers formed within a shell, wherein microcapsules are defined as having a size of 5000 microns or less and wherein macrocapsules are defined as having a size of greater than about 5000 to about 15,000 microns, wherein the second DRA has a particle size distribution different from the first particle size distribution, and the second DRA has a particle size distribution ranging from about 100 to about 550 microns; and where both DRAs are polyalpha-olefins.

* * * * *